UNITED STATES PATENT OFFICE.

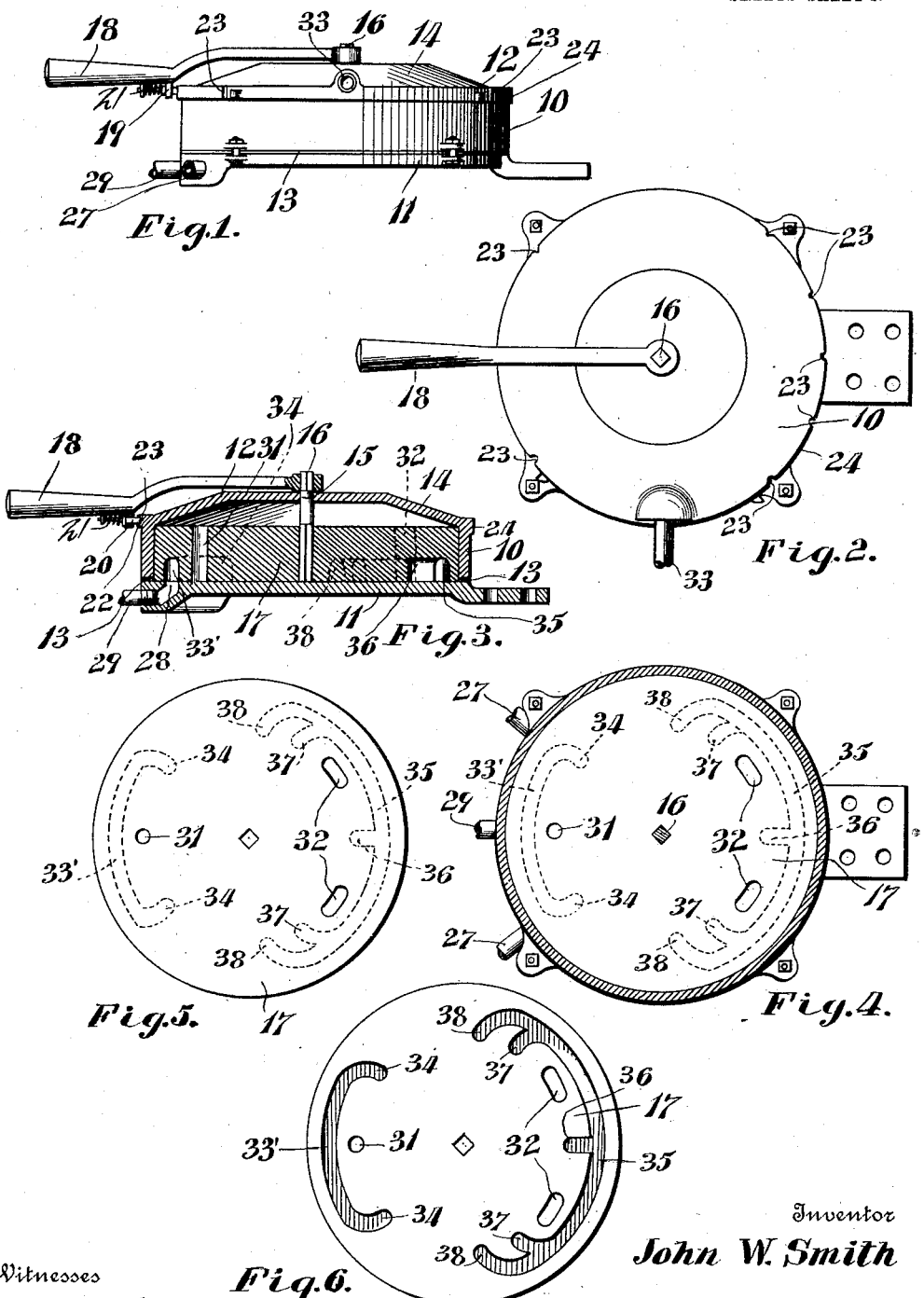

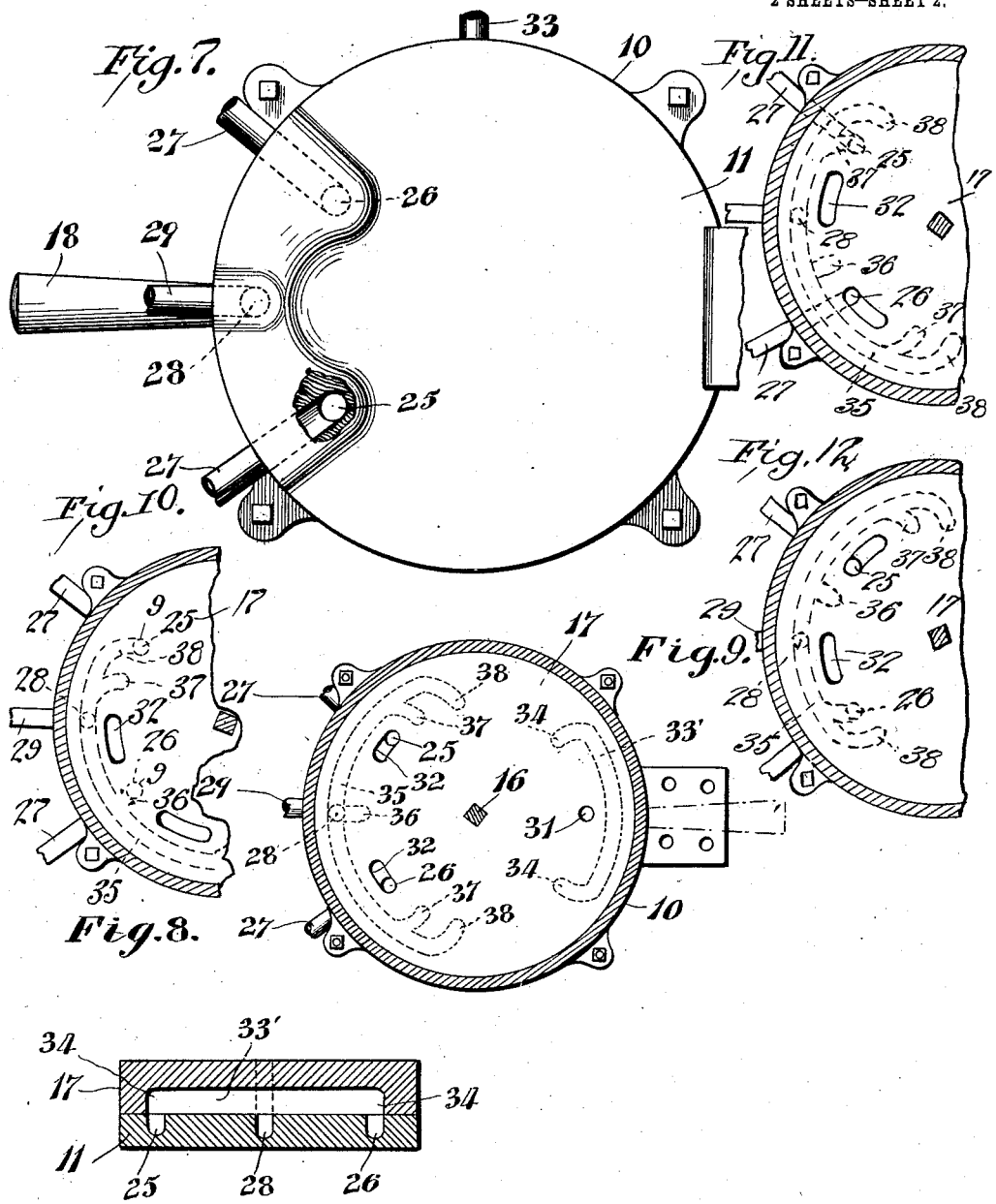

JOHN W. SMITH, OF WENDLING, OREGON.

VALVE.

1,055,092. Specification of Letters Patent. Patented Mar. 4, 1913.

Application filed June 13, 1911. Serial No. 632,841.

*To all whom it may concern:*

Be it known that I, JOHN W. SMITH, a citizen of the United States, residing at Wendling, in the county of Lane and State of Oregon, have invented new and useful Improvements in Valves, of which the following is a specification.

The invention relates to valves, and more particularly to the class of fluid distributing rotary valves.

The primary object of the invention is the provision of a valve of this character in which steam may be distributed for controlling the main and trip drums of logging or hoisting engines, so that said drums may be simultaneously or independently operated, as the occasion requires.

Another object of the invention is the provision of a valve which is capable of use in various connections, and that is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a valve constructed in accordance with the invention. Fig. 2 is a top plan view thereof. Fig. 3 is a vertical longitudinal sectional view through the valve. Fig. 4 is a horizontal sectional view through the valve. Fig. 5 is a top plan view of the rotary disk removed from the valve casing. Fig. 6 is a bottom plan view thereof. Fig. 7 is a bottom plan view of the valve casing. Fig. 8 is a diagrammatic vertical section through the valve showing the position of certain ports and passages relative to each other. Fig. 9 is a view similar to Fig. 4, showing the disk in shifted position. Fig. 10 is a fragmentary horizontal sectional view similar to Fig. 9, showing the valve disk shifted and the position of certain ports and passages relative to each other. Fig. 11 is a view similar to Fig. 10, with the valve disk again shifted showing the position of certain ports and passages relative to each other. Fig. 12 is a view similar to Fig. 11 with the valve disk further shifted, showing the position of certain ports and passages relative to each other.

Similar reference characters indicate corresponding parts throughout the several views of the drawings.

Referring to the drawings by numerals, the valve comprises a circular shell or casing 10 which includes a base 11, and a body portion 12, the latter being bolted or otherwise secured to the base at the periphery thereof, and interposed between the contacting portions of the said body and base is a resilient gasket 13 which effects a fluid tight joint between the said body and base. The body has an upwardly dished central portion 14 in its top, containing a central aperture 15, through which projects a turning stem 16 exteriorly of the casing or shell, the inner end of the stem 16 being connected to a rotatable valve disk 17 which is fixed thereto in any suitable manner and arranged within the shell or casing.

Secured to the outer end of the stem 16 is an operating handle or lever 18, the medial portion thereof being bent, so that the inner end of the lever will be offset with respect to its outer end. At the point of the bend in the lever or handle 18 are formed spaced depending guide eyes 19, in which is slidably fitted a plunger rod 20, the latter being surrounded by a coiled expansion spring 21 which is disposed between the said guide eyes, and is adapted to act upon the plunger rod 20 to force the same toward the body 12 of the valve casing or shell. This plunger rod 20 is formed with a locking head 22 adapted to engage in any one of a series of notches 23 formed in an outturned annular flange 24 on the body 12 of the valve casing or shell. Thus, in this manner the lever will be locked for sustaining the valve disk in its adjusted position within the said valve casing or shell, for a purpose presently described.

Formed in the bottom or base 11 of the valve shell or casing 10 are ports 25 and 26, communicating with conveyer pipes 27, leading to the clutch mechanism (not shown) of rotatable main and trip drums in use with logging or hoisting machines, so that when fluid is admitted to the said clutch mechanism, through the pipes 27, both of the drums may be simultaneously operated or they may be operated independently of each other by admitting fluid to one or the other of said pipes, and they may also be simultaneously or independently released, as the occasion may require.

Medially between the ports 25 and 26 and formed in the base or bottom 11 of the valve shell or casing 10 is an exhaust port 28, communicating with an exhaust pipe 29, so that upon manipulation of the valve disk, the said exhaust port 28 may be opened and closed, and when in open position will permit the exhaust of fluid from the valve casing or shell. Formed in the top of the body 12 of the valve casing or shell is an inlet port 33, the same being in communication with any suitable source of fluid supply, whereby such fluid will be admitted to the valve shell or casing. However, in this instance, steam is preferably used and is let into the valve shell or casing from a steam boiler (not shown).

The rotary valve disk 17 is formed with a circular opening 31, which extends vertically entirely through the said disk and is adapted, on the turning of the latter, to register with either of the ports 25 and 26 in the bottom of the valve shell or casing, so that steam may be admitted from the valve shell or casing to either of the pipes 27, as will be obvious. Also formed in the valve disk 17, diametrically opposite the opening 31, are spaced apart elongated slots 32 which are adapted to simultaneously or independently register with the ports 25 and 26 for permitting steam to pass from the valve shell or casing into the pipes 27 through the said ports 25 and 26, and when steam is admitted to both of these pipes 27, the main and trip drums may be operated together.

Formed in the under face of the valve disk 17, in alinement with the exhaust port 28, is a groove or channel 33' provided with inwardly converging extremities 34, the latter being adapted to simultaneously register with the ports 25 and 26, so that the steam contained within the pipes 27 may be exhausted through the exhaust port 28 for simultaneously releasing the main and trip drums of the hoisting machine.

At a diametrically opposite point with respect to the groove 33' and formed in the under face of the valve disk 17 is an arcuate shaped groove 35, the same being formed with a medial inwardly directed branch 36, and also pairs of outer branches 37 and 38, respectively, so that upon the turning of the valve disk 17 in one direction, the medial branch 36 and one of the outer branches 38 will register respectively with the ports 26 and 25 and the channel 35 is then in communication with the exhaust port 28 as shown in Fig. 9 of the drawings, thereby permitting steam to be exhausted from the pipes 27 simultaneously, whereas on turning the disk in an opposite direction, the slots 32 will simultaneously register with the ports 25 and 26, thus permitting steam to be admitted from the valve shell or casing to the said pipes 27 as shown in Fig. 9 of the drawings. Also upon further shifting of the valve disk 17, one of the slots 32 may be brought into register with the port 26 and one of the branches 37 of the groove 35 in registration with the port 25, so that steam will be simultaneously admitted to one of the pipes 27, while the steam in the other pipe 27 will be exhausted therefrom through the port 28 as shown in Fig. 11 of the drawings. Again, on shifting the valve disk 17, the other slot 32 will be caused to register with the port 25, while the other branch 37 will register with the port 26 as shown in Fig. 12 of the drawings, thus permitting steam to be admitted through the port 25 to the pipe 27, while steam in the other pipe 27 will be exhausted through the port 26 and thence to the port 28. Thus, in this manner, the main drum will be operated and the trip drum released, or vice versa, but when the slots 32 register with both the ports 25 and 26, the said main and trip drums will be simultaneously operated.

The lever or handle 18 may be shifted by hand for rotating the valve disk 17, and when the ports and grooves therein have been brought into proper relation with the ports 25, 26 and 28 in the bottom of the valve casing, the locking head 22 will engage in the proper notch in the series of notches 23, thereby locking the valve disk 17 in its adjusted position, and in this manner the main and trip drums will be simultaneously or independently operated or released, as the occasion may require.

In Fig. 8 the valve disk is shown shifted so that the channel 33' will have its terminal ends 34 in communication with the ports 25 and 26 and the said channel communicating with exhaust port 28 thereby permitting the simultaneous exhaust of fluid from both of the pipes 27. In Fig. 10 the valve disk 17 has been shifted to a position reverse from the position shown in Figs. 4 and 8, and when the said valve disk is in such position the channel 35 has one of its branches 38 in communication with the port 25 while one of the branches 36 is in communication with the port 26 so that fluid from the pipes 27 will pass directly into the exhaust port 28, the latter being in communication with the channel 35 formed in the said valve disk. In Fig. 11 the valve disk 17 is positioned so that the channel 35 has one of its branches 37 in communication with the port 25, and also the said channel has communication with the exhaust port 28 so that fluid from the port 25 will pass directly into the exhaust port 28, it being seen that the port 26 is registering with one of the openings 32 so that fluid will be admitted to the port 26. Now in Fig. 12 the valve disk 17 is shifted so that the port 26 communicates with one of the branches 37 of the channel 35, which is in communication with the exhaust port 28, thus permitting the exhaust of fluid from the port 26 into the port 28 while the port 25 is in register with one of the openings 32, whereby steam may be admitted from the valve casing into the said port 25, in this instance the said valve disk 17 being reversed to the position shown in Fig. 11 of the drawings.

What is claimed is:

1. A valve of the class described comprising a circular-shaped casing having triple ports opening through the bottom thereof, a rotatable valve disk superimposed upon the bottom of said casing, and having three openings extending entirely through the same, a pair of said openings being disposed in spaced relation to each other and diametrically opposite the remaining opening for communication with a pair of said ports, the said remaining opening being adapted for communication with one of said ports, the said disk being further provided with arcuate-shaped grooves in its under face and extending only partially through the same, the grooves being arranged opposite each other, one of said grooves being formed with inturned terminal branches, while the other groove is formed with spaced pairs of inturned terminal branches and an intermediate inturned branch and means for acting upon the disk to move the same whereby either of the grooves is adapted to register with one of the ports.

2. A valve of the class described comprising a circular-shaped casing having triple ports opening through the bottom thereof, a rotatable valve disk superimposed upon the bottom of said casing, and having three openings extending entirely through the same, a pair of said openings being disposed in spaced relation to each other and diametrically opposite the remaining opening for communication with a pair of said ports, the said remaining opening being adapted for communication with one of said ports, the said disk being further provided with arcuate-shaped grooves in its under face, the grooves being arranged opposite each other, one of said grooves being formed with inturned terminal branches, while the other groove is formed with spaced pairs of inturned terminal branches and an intermediate inturned branch, means for acting upon the disk to move the same whereby either of the grooves is adapted to register with one of the ports, and latch means carried by the last named means and engageable with the casing to hold the said last named means in adjusted position.

In testimony whereof I affix my signature in presence of two witnesses.

JOHN W. SMITH.

Witnesses:
  ORLO NETTLETON,
  W. V. CHAPMAN.

---

Copies of this patent may be obtained for five cents each, by addressing the "Commissioner of Patents, Washington, D. C."